United States Patent
Olofsson (10) Patent No.: US 9,432,261 B1
(45) Date of Patent: Aug. 30, 2016

(54) DISSEMINATION OF NAT TRAVERSAL ATTRIBUTES IN A CONTROL PLANE PROTOCOL

(71) Applicant: vIPtela Inc., San Jose, CA (US)

(72) Inventor: Lars Olof Stefan Olofsson, Dubai (AE)

(73) Assignee: VIPTELA INC., San Jose, CA (US)

( * ) Notice: Subject to any disclaimer, the term of this patent is extended or adjusted under 35 U.S.C. 154(b) by 18 days.

(21) Appl. No.: 14/252,221

(22) Filed: Apr. 14, 2014

(51) Int. Cl.
*H04L 12/24* (2006.01)
*H04L 12/56* (2006.01)

(52) U.S. Cl.
CPC ........... *H04L 41/0893* (2013.01); *H04L 41/12* (2013.01); *H04L 45/741* (2013.01)

(58) Field of Classification Search
CPC ............. H04L 61/256; H04L 61/2564; H04L 61/2592
See application file for complete search history.

(56) References Cited

U.S. PATENT DOCUMENTS

| 2006/0291443 A1* | 12/2006 | Harrington | H04L 29/12367 370/351 |
| 2011/0277029 A1* | 11/2011 | Natarajan | H04L 12/2461 726/15 |
| 2014/0379785 A1* | 12/2014 | Stokking | H04L 61/2575 709/203 |

* cited by examiner

*Primary Examiner* — Jae Y Lee
(74) *Attorney, Agent, or Firm* — HM Law Group LLP; Vani Moodley, Esq.

(57) ABSTRACT

A method for creating a secure network is provided. The method comprises establishing a controller for a plurality of edge nodes in the network; configuring each edge node to perform a discovery operation to discover Network Address Traversal (NAT) information for any NAT device associated with said edge node; and configuring each edge node to transmit any NAT information discovered through said discovery operation to the controller; and configuring the controller to distribute the NAT information received from the plurality of edge node to each edge node.

16 Claims, 6 Drawing Sheets

DISSEMINATION OF NAT TRAVERSAL ATTRIBUTES IN A CONTROL PLANE PROTOCOL

FIELD

Embodiments of the present invention relate to methods and systems for creating and operating secure wide area networks

BACKGROUND

Network Address Translation (NAT) traversal is a challenge in computer networking that has become a ubiquitous factor that must be taken into consideration when creating new protocols, technologies and services. In current networks, NAT is deployed as a means of security, address-space and network topology abstraction in addition to the originally intended purpose of extending diminishing IPv4 address space.

Because of the variety in application of NAT as a technology, differing requirements has caused great divergence in how a NAT-function is implemented on a given network device. Some implementations first and foremost consider security, while others consider scalability as the primary objective, and there are several flavors in between. Considering these factors when trying to enable an application that must operate transparently whether or not a NAT-device is present in the network transport path or not is required, but extends to a larger challenge when multiple different types of NAT implementations must be considered concurrently and in combination. Such deployments are common in current networks and present a challenge when trying to provide transparent connectivity for an application.

The common types of NAT-implementation are the following:
a. Endpoint Independent (aka Full Cone), establishes a translation entry between the inside private address and the outside public address and allows any incoming connection from the outside to be established with to the private address
b. Address Dependent (aka Restricted Cone), establishes a translation entry between the inside private address and the outside public address and only allows incoming connections from the outside originating from the address the original flow was using as the destination address.
c. Address and Port Dependent (aka Port-Restricted Cone), establishes a translation entry between the inside private address and the outside public address and only allows incoming connections from the outside originating from the address and upper layer protocol port the original flow was using as the destination address and port.
d. Symmetric, establishes a translation entry between the inside private address and the outside public address where the outside upper layer protocol port is uniquely assigned to every Source Address/Port and Destination Address/Port flow that creates the translation entry in the NAT. Any incoming connection not exactly matching the outside Source Address/Port and Destination Address/Port is disallowed.

Depending on the specific type of NAT that a given node may be sitting behind or employing locally, incoming connections are treated differently as is evident by the definition of the different types of NAT discussed above. This can create connectivity issues since different protocols deal with NAT-traversal in different ways and may not be able to traverse certain types of NAT without an adaptation of behavior or using a third party node to merge the different legs of a given session-layer connection. In many current implementations, protocols have been adapted to support NAT-traversal and then assume that the NAT will behave in a certain way. If the conditions related to session establishment in such a context are not met then a node may be trying indefinitely, resulting in a poor user experience, where additional information could have allowed for different approach to be taken to ensure that a working communication channel could be established.

SUMMARY

According to one aspect of the invention, there is method for creating a secure network, comprising:
 establishing a controller for a plurality of edge nodes in the network;
 configuring each edge node to perform a discovery operation to discover Network Address Traversal (NAT) information for any NAT device associated with said edge node; and
 configuring each edge node to transmit any NAT information discovered through said discovery operation to the controller; and
 configuring the controller to distribute the NAT information received from the plurality of edge node to each edge node.

According to a second aspect of the invention, there is provided a method for an first edge node in a network to create a secure communications session with a second edge node in the network, comprising:
 performing a discovery operation by the first edge node to discover Network Address Traversal (NAT) information for any NAT device associated with said first edge node; and
 transmitting any NAT information discovered through said discovery operation to a controller for the network;
 selectively receiving NAT information for any NAT devices associated with other edge nodes in the network; and
 establishing the secure communications in accordance with a connection protocol configured based on availability of information selected from the group consisting of policy, NAT information, data plane information, a remote action, and third party stitching information.

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention. Accommodate Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention disclose a mechanism for each endpoint in a network to make independent and informed decisions on how to approach session establishment with another (remote) endpoint.

Each endpoint may employ local procedures to discover the attributes of its local network environment if needed, alternatively a NAT device may be employed locally on the node and hence no discovery procedures are required. In one embodiment, the specific nature of the local NAT device may be shared with all other endpoints in the network using a common control plane protocol. How the receiving endpoints end up using the received information on the NAT-attributes of other endpoints is entirely a local decision and may vary depending on local policy configuration or the specific role that the receiving endpoint has in the network.

Figure 1:
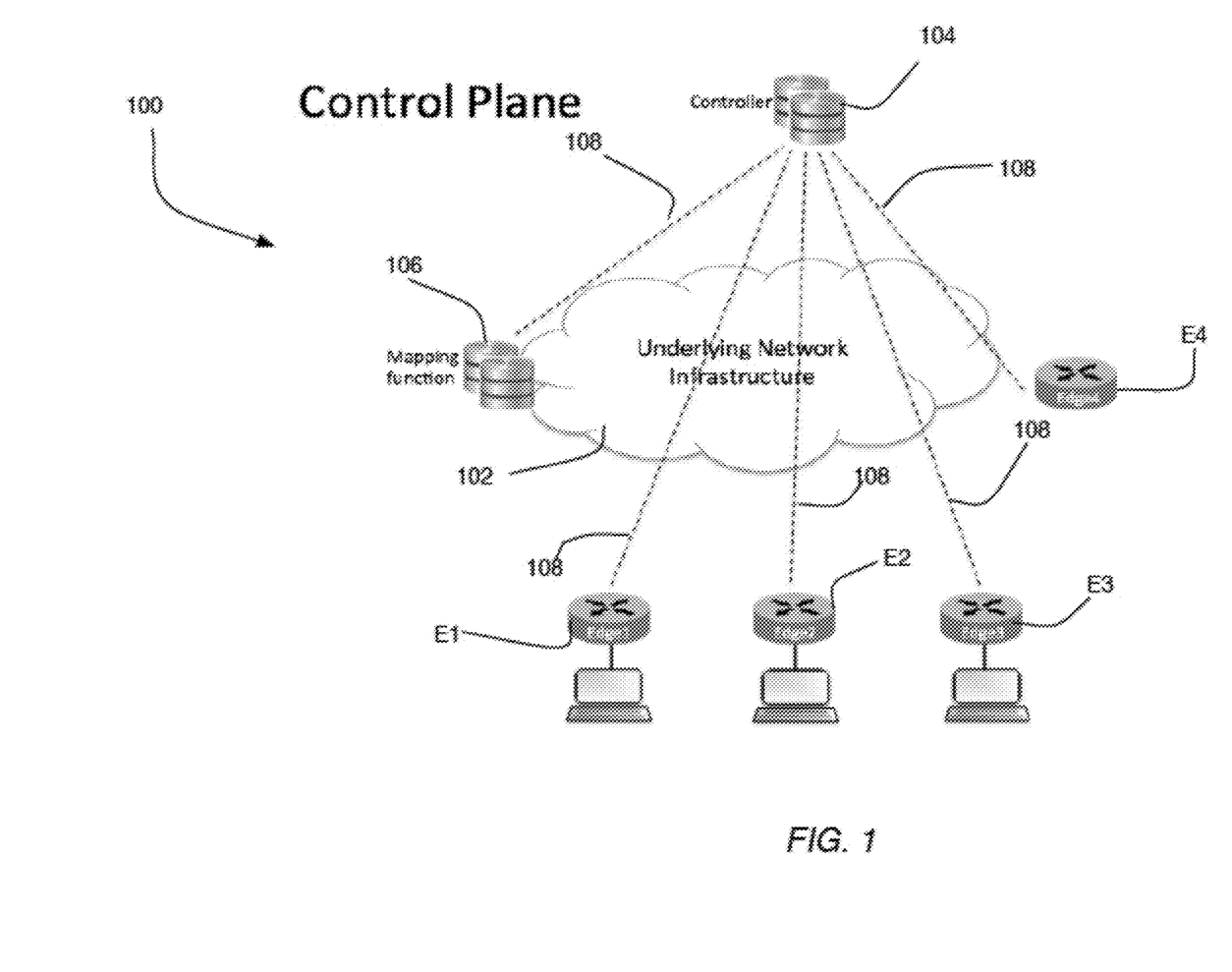
FIG. 1 shows a network 100 with a control plane, in accordance with one embodiment of the invention.
Figure 2:
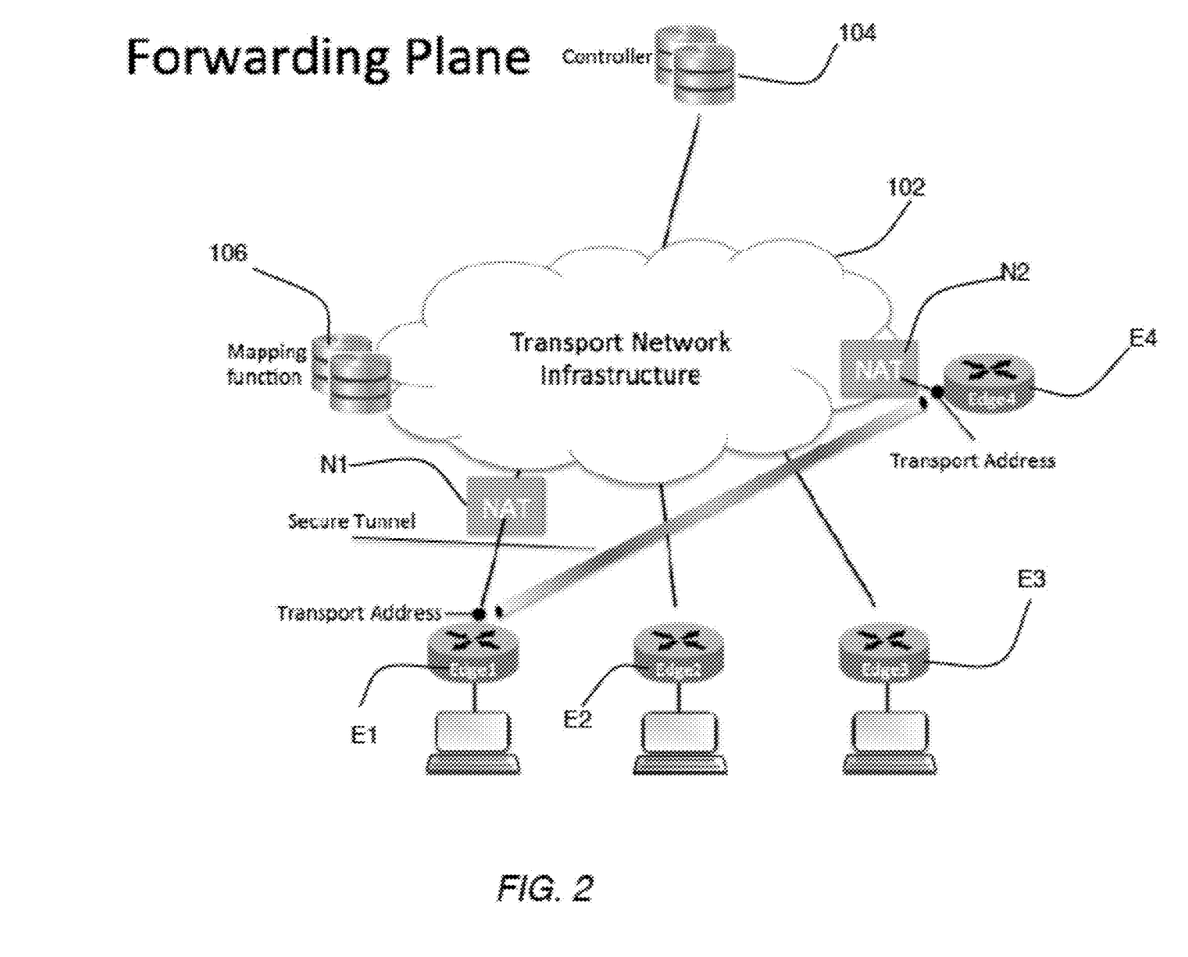
FIG. 2 shows a forwarding plane established in the network 100, in accordance with one embodiment of the invention.

FIG. 1 shows a representative network 100 in accordance with one embodiment of the invention. Referring to FIG. 1, reference numeral 102 indicates underlying network infrastructure that may be used to connect endpoints/edges E1 to En together. In one embodiment, the endpoints/edges may represent branch office routers. In FIG. 1 only four edges are shown and are indicated as edges E1 to E4, respectively. However, it is to be understood that many more edges are possible in accordance with different embodiments.

The underlying network infrastructure 102 may include elements that form a Wide Are Network (WAN) and in some embodiments may include public and/or private infrastructure. For example, in one embodiment the underlying network infrastructure 102 may include the public Internet.

In one embodiment, the network 100 may be configured to support a control plane, which is established to all endpoints in the network. Techniques for establishing the control plane are using an Overly Management Protocol, are described in U.S. patent application Ser. No. 14/133,558 entitled "OVERLAY MANAGEMENT PROTOCOL FOR SECURE ROUTING BASED ON AN OVERLAY NETWORK" which is incorporated herein by reference in its entirety. The control plane serves as a distribution vehicle for the discriminators. In one embodiment, to facilitate the establishment of said control plane, the network 100 further comprises a controller 104 and a mapping server 106. The mapping server 106 supports a bring up method used to establish the control plane as is described in U.S. patent application Ser. No. 14/028,518 entitled "SECURE BRING-UP OF NETWORK DEVICES" which is incorporated herein by reference in its entirety. In one embodiment, the control plane is defined by secure control channels 108 between the controller 104 and the various edges in the network 100, and the between the controller 104 and the mapping server 106. In one embodiment, the channels 108 may comprise DTLS links.

Figure 3:
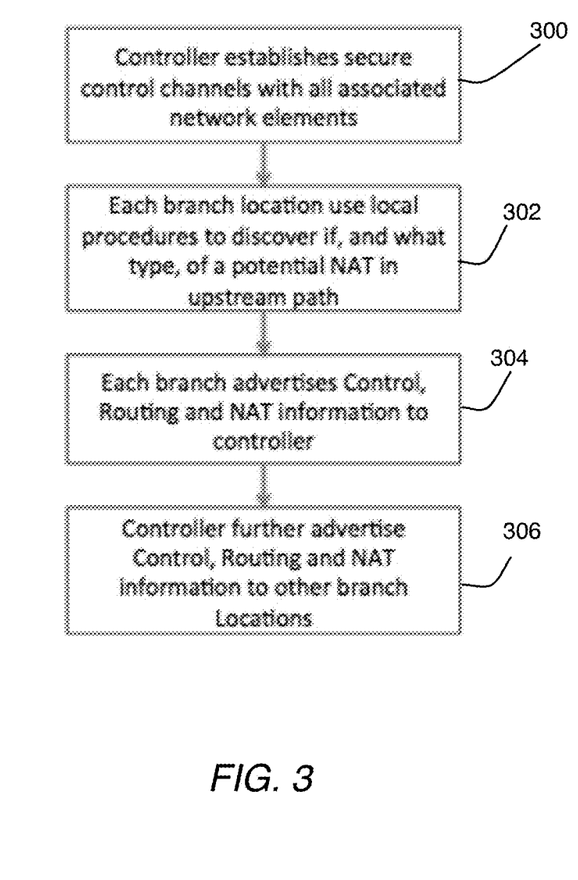
FIG. 3 shows an exemplary setup procedure for the network 100, in accordance with one embodiment of the invention.

The establishment of the control channels 108 is indicated by block 300 in FIG. 3, which shows an exemplary setup procedure, in accordance with one embodiment of the invention.

Communications between the devices E1 to En occurs via a data plane connection between the devices. The establishment of the data plane is described in U.S. patent application Ser. No. 14/146,683 entitled "BI-DIRECTIONAL NAT TRAVERSAL USING ENDPOINT ASSIGNED DISCRIMINATORS", which is incorporated herein by reference in its entirety, Each branch location or edge E1 to En may be configured to use local procedures to discover if, and what type of a potential NAT device resides in its upstream path. For example, the edge E1 will discover what type of NAT the NAT device N1 supports, or the edge E4 will discover what type of NAT the NAT device N2 supports. This step is indicated by reference numeral 302 in FIG. 3.

Continuing with FIG. 3, at block 304, each branch location or node in the network 100 advertises control, routing, and NAT information to the controller 104. In one embodiment, the local routing information may comprise:
  a) A Transport Address, e.g. in the form of an IPv4-address, and an Upper Layer protocol port, used as a next-hop address for the other components of the routing table advertised by the node. In one embodiment, the Transport Address consists of information representing the node on the inside and also on the outside of a potential NAT-device, post translation.
  b) In one embodiment, included and associated with the Transport Address is also a Discriminator value that is persistent in the distribution of information across the control plane elements; and
  c) The type of NAT that can be associated with each of the transport addresses.

At block 306, the controller 104 advertises the local routing information with each of the edges E1 to E4 via the control plane channels 108.

In one embodiment, each branch office router E1 to E4 may be configured to examine the type of NAT, if any, for each transport address when parsing the routing information received from the central controller 104 to establish the topology within which it operates.

When a given branch office router determines if and how it will establish a communication channel with other branch office routers, the NAT-information received influences how the establishment process will be carried out. A local branch office router may have a local policy configured to determine which locations it will establish direct channels to depending on its ability to traverse different types of NAT, otherwise to use an intermediate session stitching location or to communicate via a third site offering those abilities.

Figure 4:
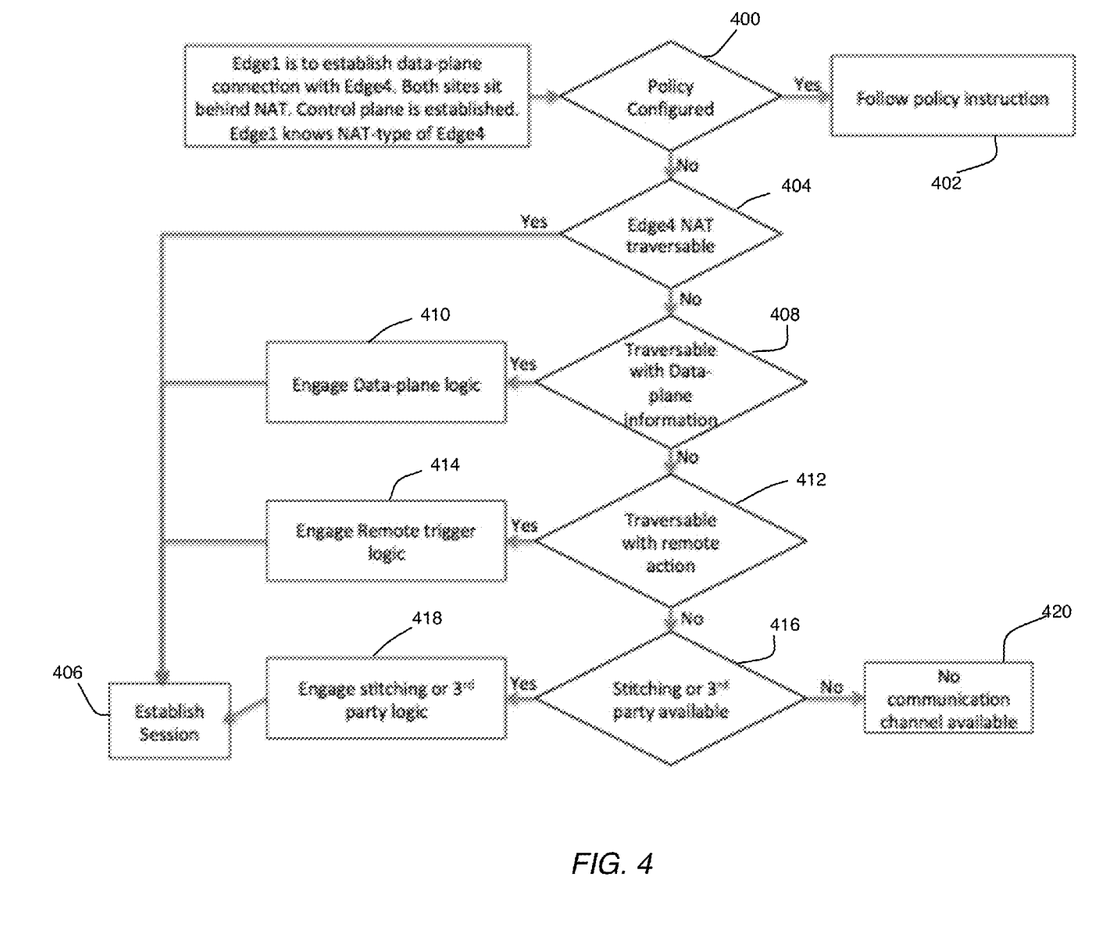
FIG. 4 shows the processing steps for establishing communications between an edge E1 located behind symmetric NAT device and an edge E4, in accordance with one embodiment of the invention.

If no policy has been configured, each branch office router will determine, based on its default NAT-traversal abilities to take certain actions, which may include:
  a. Trigger actions at an originating branch office router to enable NAT-traversal using additional control plane messages
  b. Engaging in different setup techniques for establishing communication channels with other branch office routers, which may involve information learnt in the data plane from other routers
  c. Deciding whether to establish a session or not, if allowed by the type of NAT deployed at the remote site By way of example, FIG. 4 shows the processing steps associated with a connection protocol for establishing communications between the edge E1 and the edge E4 based on the techniques disclosed above. It will be recalled that the edge E1, which sits behind the NAT device N1 is to establish a data-plane session with the edge E4, which is located behind the NAT device N2. The device E1 has established a control channel with the controller 104 and has received NAT information from the controller 104 as described above. Thus, the device E1 knows the NAT type for the device N2 which is located upstream of the device E4.

At block 400, the node E1 checks if it has been configured with policy to control session establishment. If indeed E1 has been so configured then at block 402, the configured policy is followed. However, if E1 has not been provisioned with policy to control session establishment, then the block 404 executes wherein it is determined if the edge E4 is NAT traversable. For cases where the edge E4 is NAT traversable, then the NAT information for the node E4 is used at block 406 to establish a communications session with the node E4.

If the node E4 is not NAT traversable, then at block 408 the node E1 determines if the node E4 can be reached with data plane information. If this is the case, then at block 410 data plane logic is executed in order to establish a session with the node E4 at block 408.

If at block 408 it is determined that E4 is not reachable via data plane information, then block 412 executes where it is determined if the edge E4 is reachable through execution of a remote action. For the case where the node E4 is so reachable, then control passes to block 414 where logic associated with the remote action is executed, and a session with the node E4 is established at block 406.

Where the node E4 is not reachable through execution of a remote action control passes from the block 412 to the block 416. At the block 416, the node E1 determines if the third party stitching is available whereby the node E4 may be reached. When third party stitching is available, control passes to block 418 where the third party stitching logic is executed and the session to the node E4 is established at block 406.

If no third party stitching is available, then the node E4 is not reachable as indicated by the block 420.

Figure 5:
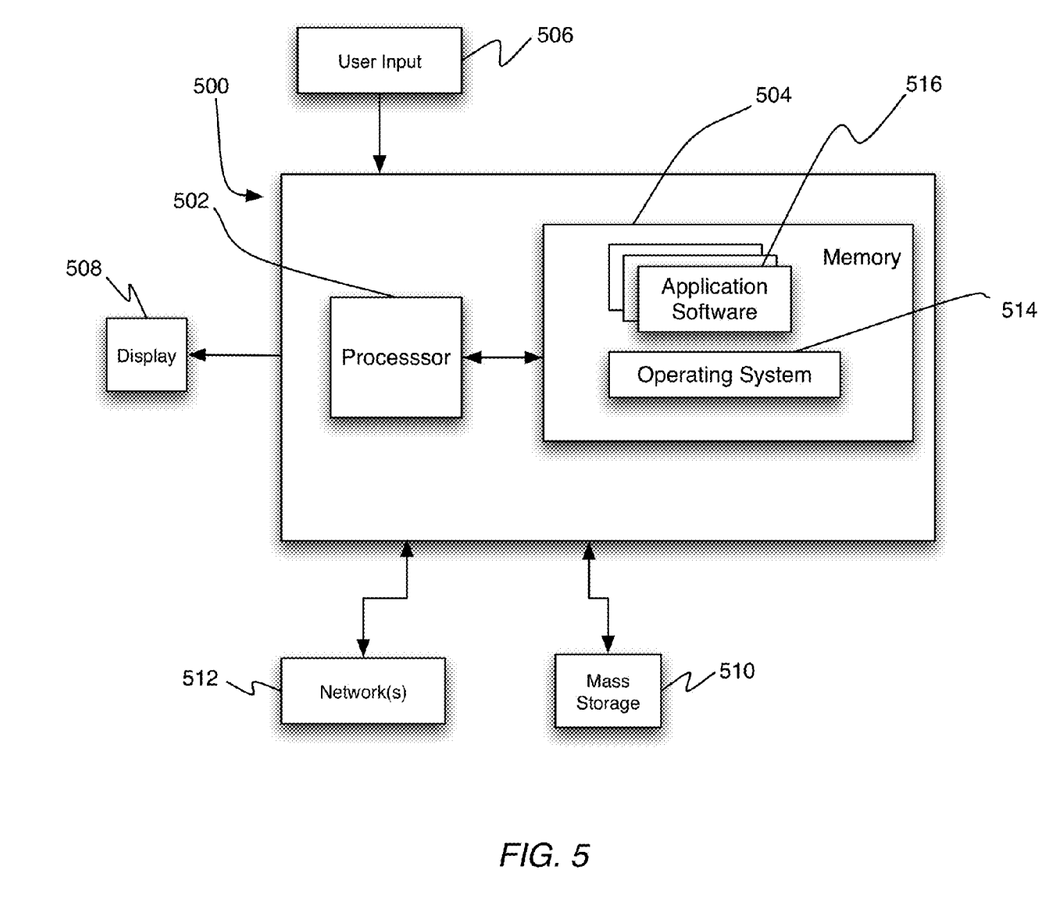
FIG. 5 shows a high-level block diagram for a controller and mapping server, in accordance with one embodiment of the invention.

Embodiments of the present invention discloses equipping each endpoint of a network infrastructure with information on the local attributes for other endpoints thereby to allow every endpoint to make better educated decisions on how to approach connectivity with other endpoints. These approaches may involve several different action, including:
  a. Establishing connectivity directly with the other endpoint since the local NAT of the endpoint allows for it.
  b. Using an alternate location that allows for multiple legs of a session to be stitched together.
  c. Using an alternate location that has the capability to communicate with the ultimate endpoint through specific, but unrelated means.
  d. Triggering actions in the target endpoint to allow for a session to be established.
  e. Using alternate connectivity establishment procedures or alternate endpoint information when initiating session establishment FIG. 5 shows an example of hardware 500 that may be used to implement the controller 504 and the mapping server 506, in accordance with one embodiment. The hardware 500 may includes at least one processor 502 coupled to a memory 504. The processor 503 may represent one or more processors (e.g., microprocessors), and the memory 504 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 504 may be considered to include memory storage physically located elsewhere in the hardware, e.g. any cache memory in the processor 502, as well as any storage capacity used as a virtual memory, e.g., as stored on a mass storage device.

The hardware also typically receives a number of inputs and outputs for communicating information externally. For interface with a user or operator, the hardware may include one or more user input output devices 506 (e.g., a keyboard, mouse, etc.) and a display 508. For additional storage, the hardware 500 may also include one or more mass storage devices 510, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 512 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 612 and each of the components, as is well known in the art.

The hardware 500 operates under the control of an operating system 514, and executes application software 516 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Figure 6:
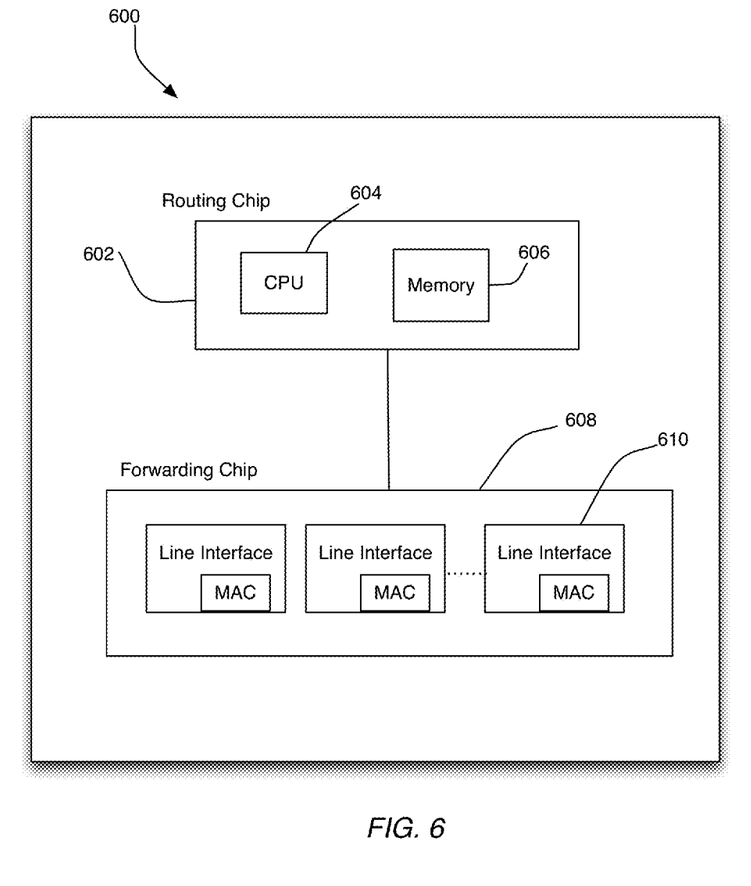
FIG. 6 shows a high-level block diagram of hardware for a router/endpoint, in accordance with one embodiment of the invention.

FIG. 6 shows a block diagram of hardware 600 for edge routers E1-En and ma described above, in accordance with one embodiment of the invention. Referring to FIG. 6, the hardware 700 includes a routing chip 604 coupled to a forwarding chip 608. The routing chip 604 performs functions such as path computations, routing table maintenance, and reachability propagation. Components of the routing chip include a CPU or processor 604, which is coupled to a memory 606. The memory stores instructions to perform the methods disclosed herein. The forwarding chip is responsible for packet forwarding along a plurality of line interfaces 610.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method for creating a secure network, comprising:
 establishing a controller for a plurality of edge nodes in the network;
 configuring each edge node to perform a discovery operation to discover Network Address Translator (NAT) information for any NAT device associated with said edge node; and
 configuring each edge node to transmit any NAT information discovered through said discovery operation to the controller; and
 configuring the controller to distribute the NAT information received from the plurality of edge node to each edge node;
 configuring a first edge node from the plurality of edge nodes to establish a secure communications session with a second edge node from the plurality of edge nodes in accordance with a connection protocol configured based on availability of information selected from the group consisting of policy, NAT information, data plane information, a remote action, and third party stitching information; wherein the connection protocol is biased to establish the secure communications session based on policy and based on NAT information associated with the second edge node if said policy is not available.

2. The method of claim 1, wherein the connection protocol is biased to establish the secure communications session based data plane information if said NAT information is not available.

3. The method of claim 2, wherein the connection protocol is biased to establish the secure communications session based on a remote action if said data plane is not available.

4. The method of claim 3, wherein the connection protocol is biased to establish the secure communications session based on third party stitch information if said remote action information associated is not available.

5. A method for a first edge node in a network to create a secure communications session with a second edge node in the network, comprising:
 performing a discovery operation by the first edge node to discover Network Address Translator (NAT) information for any NAT device associated with said first edge node; and
 transmitting any NAT information discovered through said discovery operation to a controller for the network;
 selectively receiving NAT information for any NAT devices associated with other edge nodes in the network; and
 establishing the secure communications in accordance with a connection protocol configured based on availability of information selected from the group consisting of policy, NAT information, data plane information, a remote action, and third party stitching information; wherein the connection protocol is biased to establish the secure communications session based on policy and based on NAT information associated with the second edge node if said policy is not available.

6. The method of claim 5, wherein the connection protocol is biased to establish the secure communications session based data plane information if said NAT information is not available.

7. The method of claim 6, wherein the connection protocol is biased to establish the secure communications session based on a remote action if said data plane is not available.

8. The method of claim 7, wherein the connection protocol is biased to establish the secure communications session based on third party stitch information if said remote action information associated is not available.

9. A non-transitory computer-readable medium, having stored instructions which when executed by a first edge node in a network causes the first edge node perform a method to create a secure communications session with a second edge node in the network, comprising:
 performing a discovery operation by the first edge node to discover Network Address Translator (NAT) information for any NAT device associated with said first edge node; and
 transmitting any NAT information discovered through said discovery operation to a controller for the network;
 selectively receiving NAT information for any NAT devices associated with other edge nodes in the network; and
 establishing the secure communications in accordance with a connection protocol configured based on availability of information selected from the group consisting of policy, NAT information, data plane information, a remote action, and third party stitching information; wherein the connection protocol is biased to establish the secure communications session based on policy and based on NAT information associated with the second edge node if said policy is not available.

10. The method of claim 9, wherein the connection protocol is biased to establish the secure communications session based data plane information if said NAT information is not available.

11. The method of claim 10, wherein the connection protocol is biased to establish the secure communications session based on a remote action if said data plane is not available.

12. The method of claim 11, wherein the connection protocol is biased to establish the secure communications session based on third party stitch information if said remote action information associated is not available.

13. An edge node, comprising:

a processor; and a memory coupled to the processor, the memory storing instructions which when executed by the processor causes the edge node to perform a method to create a secure communications session with a second edge node in a network, comprising:

performing a discovery operation by the first edge node to discover Network Address Translator (NAT) information for any NAT device associated wife said first edge node; and transmitting any NAT information discovered through said discovery operation to a controller for the network;

selectively receiving NAT information for any NAT devices associated with other edge-nodes in the network; and establishing the secure communications in accordance with a connection protocol configured based on availability of information selected from the group consisting of policy, NAT information, data plane information, a remote action, and third party stitching information; wherein the connection protocol is biased to establish the secure communications session based on policy and based on NAT information associated with the second edge node if said policy is not available.

14. The method of claim 13, wherein the connection protocol is biased to establish the secure communications session based data plane information if said NAT information is not available.

15. The edge node of claim 14, wherein the connection protocol is biased to establish the secure communications session based on a remote action if said data plane is not available.

16. The edge node of claim 15, wherein the connection protocol is biased to establish the secure communications session based on third party stitch information if said remote action information associated is not available.

* * * * *